(12) United States Patent
Van Zon

(10) Patent No.: US 12,506,592 B2
(45) Date of Patent: Dec. 23, 2025

(54) PRIVACY-SAFE-CLOUD-BASED COMPUTER VISION

(71) Applicant: KONINKLIJKE PHILIPS N.V., Eindhoven (NL)

(72) Inventor: Cornelis Van Zon, Everett, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 155 days.

(21) Appl. No.: 18/266,904

(22) PCT Filed: Dec. 8, 2021

(86) PCT No.: PCT/EP2021/084687
§ 371 (c)(1),
(2) Date: Jun. 13, 2023

(87) PCT Pub. No.: WO2022/128653
PCT Pub. Date: Jun. 23, 2022

(65) Prior Publication Data
US 2024/0106629 A1      Mar. 28, 2024

Related U.S. Application Data

(60) Provisional application No. 63/124,914, filed on Dec. 14, 2020.

(51) Int. Cl.
*H04L 29/06* (2006.01)
*H04L 9/06* (2006.01)

(52) U.S. Cl.
CPC .................. *H04L 9/0662* (2013.01)

(58) Field of Classification Search
None
See application file for complete search history.

(56) References Cited

U.S. PATENT DOCUMENTS

| | | | |
|---|---|---|---|
| 10,755,810 B2* | 8/2020 | Buckler | G16H 30/40 |
| 10,956,591 B1* | 3/2021 | Joshi | G06F 21/602 |
| 2009/0327748 A1* | 12/2009 | Agrawal | G06F 21/6227 |
| | | | 707/E17.014 |
| 2017/0317983 A1 | 11/2017 | Pramod | |

(Continued)

FOREIGN PATENT DOCUMENTS

| | | |
|---|---|---|
| CN | 108600573 B | 9/2018 |
| WO | 2016037160 A2 | 3/2016 |

OTHER PUBLICATIONS

Tseng, Fu-Kuo et al. Ensuring correctness of range searches on encrypted cloud data. 4th IEEE International Conference on Cloud Computing Technology and Science Proceedings. https://ieeexplore.ieee.org/stamp/stamp.jsp?tp=&arnumber=6427558 (Year: 2012).*

(Continued)

*Primary Examiner* — Jeremiah L Avery

(57) ABSTRACT

Methods and systems for protecting digital client data transmitted to a computing cloud (200) for data processing ensure privacy of the client data by transmitting only scrambled client data to the computing cloud and never storing descrambled client data in the computing cloud. To the extent that descrambling is necessary for processing the client data with the computing cloud, descrambling is embedded in the processing so that descrambled client data is never output or stored by the computing cloud.

21 Claims, 2 Drawing Sheets

(56) References Cited

U.S. PATENT DOCUMENTS

| | | | | |
|---|---|---|---|---|
| 2019/0386969 | A1* | 12/2019 | Verzun | G06F 21/606 |
| 2019/0394171 | A1* | 12/2019 | Kaman | H04L 9/0662 |
| 2020/0004969 | A1* | 1/2020 | Benke | H04L 63/0428 |
| 2020/0065515 | A1* | 2/2020 | Wu | G06F 21/6245 |
| 2020/0074084 | A1* | 3/2020 | Dorrans | G06F 21/577 |
| 2020/0311304 | A1* | 10/2020 | Parthasarathy | G06F 11/3006 |
| 2020/0380160 | A1* | 12/2020 | Kraus | G06F 21/577 |
| 2020/0382290 | A1* | 12/2020 | Yang | H04L 9/0894 |
| 2020/0382517 | A1* | 12/2020 | Alsina | G06F 21/629 |
| 2021/0058229 | A1* | 2/2021 | Jiang | G06F 21/6245 |
| 2021/0098137 | A1* | 4/2021 | Carroll | G06F 21/6245 |
| 2021/0125089 | A1* | 4/2021 | Nickl | H04W 12/02 |
| 2021/0243233 | A1* | 8/2021 | Singh | H04L 63/0435 |
| 2021/0248090 | A1* | 8/2021 | Martin | G06F 21/44 |
| 2021/0248253 | A1* | 8/2021 | Fuhry | G06F 21/53 |
| 2021/0319133 | A1* | 10/2021 | Teich | G06F 21/6245 |
| 2021/0326460 | A1* | 10/2021 | Zhang | G06F 16/2379 |
| 2025/0258956 | A1* | 8/2025 | Crabtree | G06F 21/53 |

OTHER PUBLICATIONS

Gahi, Youssef et al. Encrypted processes for oblivious data retrieval. 2011 International Conference for Internet Technology and Secured Transactions. https://ieeexplore.ieee.org/stamp/stamp.jsp?tp=&arnumber=6148390 (Year: 2011).*

Qin, Zhan et al. Towards Efficient Privacy-preserving Image Feature Extraction in Cloud Computing. MM '14: Proceedings of the 22nd ACM international conference on Multimedia. pp. 497-506. https://dl.acm.org/doi/epdf/10.1145/2647868.2654941 (Year: 2014).*

Taru, Swapnil Dattatraya; Maral, Vikas B. Object oriented accountability approach in cloud for data sharing with patchy image encryption. 2015 International Conference on Advances in Computing, Communications and Informatics (ICACCI). https://ieeexplore.ieee.org/stamp/stamp.jsp?tp=&arnumber=7275856 (Year: 2015).*

Gupta, Aurobindo et al. An efficient scheme to secure cloud with diversified fortified mechanisms. 2017 International Conference on Big Data Analytics and Computational Intelligence (ICBDAC). https://ieeexplore.ieee.org/stamp/stamp.jsp?tp=&arnumber=8070829 (Year: 2017).*

Shahid, Fizza et al. PSDS—Proficient Security Over Distributed Storage: A Method for Data Transmission in Cloud. IEEE Access, vol. 8. https://ieeexplore.ieee.org/stamp/stamp.jsp?tp=&arnumber=9123378 (Year: 2020).*

International Search Report Dated Mar. 10, 2022 For International Appln. No. PCT/EP2021/084687 Filed Dec. 8, 2021.

Zhan Qin et al: "Towards Efficient Privacy-preserving Image Feature Extraction in Cloud Computing", Multimedia, ACM, 2 Penn Plaza, Suite 701 New York NY 10121-0701 USA, Nov. 3, 2014 (Nov. 3, 2014), pp. 497-506, XP058058706,DOI: 10.1145/2647868.2654941.

Mohanty Manoranjan et al: "2DCrypt : Image Scaling and Cropping in Encrypted Domains", IEEE Transactions on Information Forensics and Security, IEEE, USA, vol. 11, No. 11, Nov. 1, 2016 (Nov. 1, 2016), pp. 2542-2555, XP011621472, ISSN: 1556-6013, DOI: 10.1109/TIFS.2016.2585085.

* cited by examiner

PRIVACY-SAFE-CLOUD-BASED COMPUTER VISION

CROSS-REFERENCE TO PRIOR APPLICATIONS

This application is the U.S. National Phase application under 35 U.S.C. § 371 of International Application No. PCT/EP2021/084687, filed on Dec. 8, 2021, which claims the benefit of U.S. Provisional Application No. 63/124,914 filed on Dec. 14, 2020. These applications are hereby incorporated by reference herein.

BACKGROUND OF THE INVENTION

1. Field of the Invention

The disclosed concept pertains to methods and systems for protecting privacy of digital data, and, in particular, to methods and systems for protecting digital data transmitted to, stored in, and/or processed by a computing cloud.

2. Description of the Related Art

Off-premise cloud computing is widespread in the modern era and offers a variety of benefits over on-premise computing, which includes on-premise cloud computing and on-premise off-line computing. Clients of off-premise cloud computing services are often attracted to such services because third party providers of off-premise cloud computing often have greater hardware and software processing and storage capacity and therefore greater scalability than clients do. Off-premise cloud computing has become particularly desirable in the medical and related fields, where off-premise computing permits healthcare providers and institutions to process digital image and video data and store electronic health records, among other functions. However, sending data off-site to third party providers of cloud computing services raises data safety and security concerns for clients. Well-known technologies and solutions for ensuring data safety and security related to cloud computing include: (i) protecting the communication between the client and the cloud by means of encryption/decryption, for example, via a virtual private network (VPN), (ii) protecting access to individual cloud-based computers via authentication and/or firewall technology, and (iii) protecting data stored on cloud-based hard drives by means of encryption. While such technologies and solutions are generally effective, clients of cloud services may still feel hesitant about sending privacy-sensitive data to off-site third-party owned servers (i.e., computing clouds) and storing and processing such data there because of the possibility of a hacker breaking into the communication system, the hard drives, or even the RAM of a cloud-based computer. Privacy concerns may be especially pronounced with respect to image data such as still pictures and digital video of patients, and medical data such as clinician voice memos or written patient notes.

Given how ubiquitous cloud computing is in the healthcare industry and other privacy-sensitive contexts, protecting the privacy of cloud clients and their sensitive data is of high importance for both providers and clients of cloud services. While known technologies and solutions for ensuring data safety and security related to cloud computing are generally effective, the possibility of hacking, however remote, is a legitimate cause for concern for anyone who wants to protect the privacy of sensitive data stored or processed using cloud services. Accordingly, there is room for improvement in methods and system used to ensure the privacy of digital data transmitted to, stored, and/or processed using computing clouds.

SUMMARY OF THE INVENTION

Accordingly, it is an object of the present invention to provide, in one embodiment, a method of transmitting digital data between a client computing system and a cloud computing system and processing the digital data with the cloud computing system, the method comprising: capturing, with a recording device in the client system, unscrambled data; scrambling, with the client computing system, the unscrambled data to produce scrambled data; transmitting, with the client computing system, the scrambled data to the cloud computing system; processing, with the cloud computing system, the scrambled data; and transmitting, with the cloud computing system, an output of the processing to the client computing system, wherein descrambled data is not stored in the cloud computing system, and wherein the output of the processing does not include a descrambled form of the scrambled data.

The processing with the cloud computing system may comprise either or both descrambling the scrambled data and producing output mapped to the unscrambled data. The unscrambled data may comprise data sequences such that each data sequence comprises a plurality of component data units. Scrambling for such data sequences may comprise using a stored lookup table to map each of the plurality of component data units in a given data sequence to a pseudorandom location, the pseudorandom location being unique relative to pseudorandom locations to which all other component data units in the given data sequence are mapped. Scrambling for such data sequences may alternatively comprise using a mathematical function to map each of the plurality of component data units in a given data sequence to a new location, the new location being unique relative to new locations to which all other component data units in the given data sequence are mapped. The technique of scrambling used to scramble the unscrambled data may be periodically changed by the client computing system. Transmitting the scrambled data from the client system to the cloud may comprise transmitting with the scrambled data a scrambling identifier that the cloud computing system can use to identify what technique of scrambling was used by the client computing system. The method may further comprise descrambling any scrambled output of the processing with the client computing system.

In another embodiment, a data protection system for protecting digital ordered data sequences comprises: a client computing system configured to capture and transmit client data outside of the client computing system, the client computing system comprising a recording device configured to capture client data comprising data sequences such that each data sequence comprises a plurality of component data units, a data scrambler configured to receive client data captured by the recording device and to scramble the client data, and a processed data receiver; and a cloud computing system, the cloud computing system comprising a data processing module configured to process client data transmitted from the client computing system and to output processed client data, and a cloud storage unit configured to store client data processed and output by the data processing module, wherein the client computing system is configured to transmit only scrambled client data to the cloud computing system, and wherein the data processing module is configured to not output descrambled client data.

The data processing module may be configured for either or both descrambling scrambled client data during processing and producing output mapped to unscrambled client data. Scrambling a given data sequence may comprise using a stored lookup table to map each of the plurality of component data units in the given data sequence to a pseudorandom location, the pseudorandom location being unique relative to pseudorandom locations to which all other component data units in the given data sequence are mapped. Scrambling a given data sequence may alternatively comprise using a mathematical function to map each of the plurality of component data units in the given data sequence to a new location, the new location being unique relative to new locations to which all other component data units in the given data sequence are mapped. The client computing system may be configured to periodically change a data scrambling technique used by the data scrambler. The client computing system may be additionally configured to transmit a scrambling identifier when transmitting scrambled client data to the cloud computing system, and the cloud computing system may be configured to identify what technique of scrambling was used by the client computing system based on the scrambling identifier.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION OF EXEMPLARY EMBODIMENTS

Figure 1:
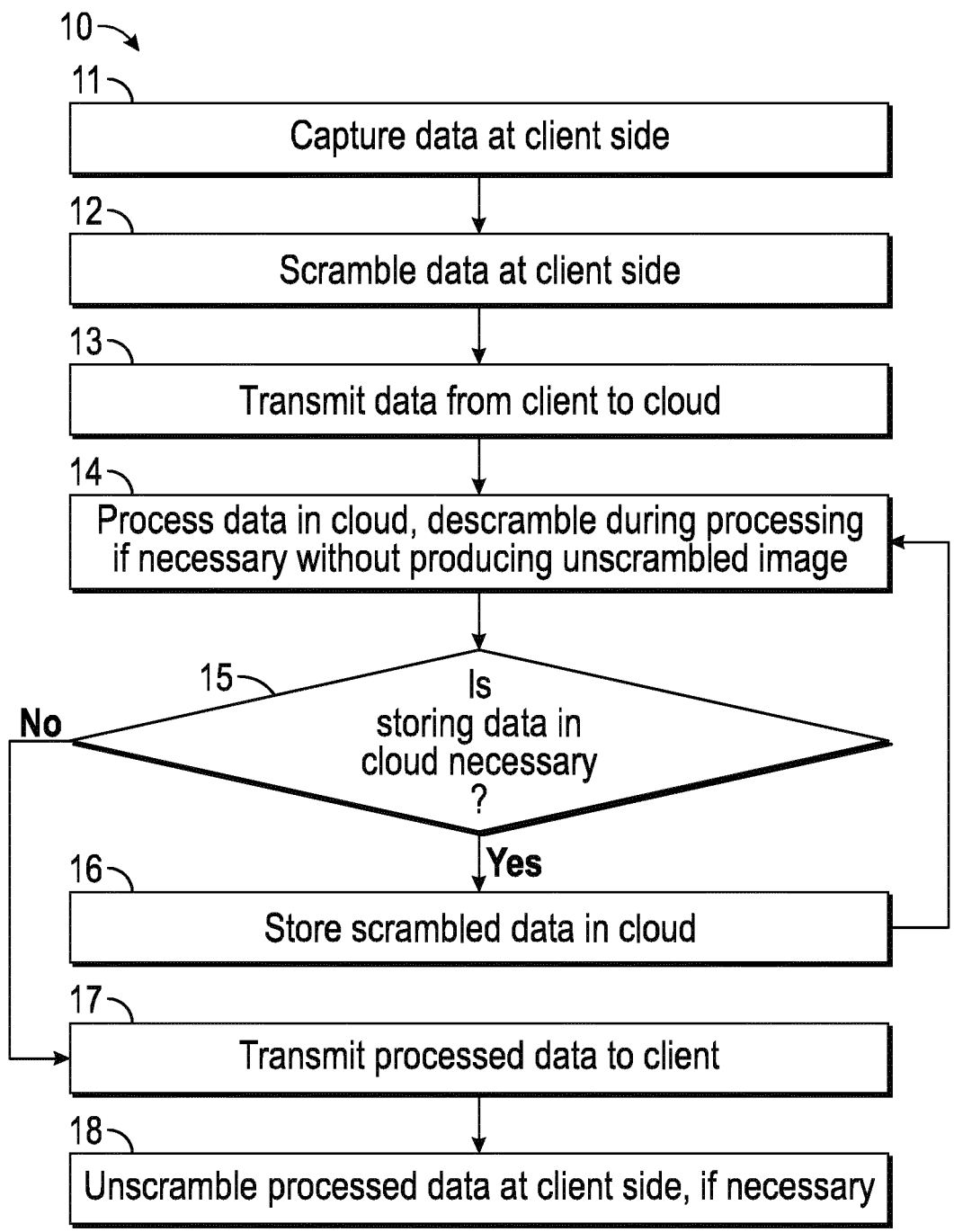
FIG. 1 is a flow chart containing the steps of a method for protecting digital data transmitted from a client computing system to a cloud computing system in accordance with an exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "computing cloud" or "cloud" shall mean computer system resources, including but not limited to data storage and computing power, available to a user over the internet without direct active management by the user.

As used herein, the term "client" shall mean a user of cloud services, such user including but not limited to a computing system.

As used herein, the term "controller" shall mean a number of programmable analog and/or digital devices (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the term "number" shall mean one or an integer greater than one (i.e., a plurality).

As used herein, the term "scramble" shall mean, with respect to a data entity whose components are intended to be arranged in a particular sequence in order to render the data entity comprehensible, to change the order of the components such that the data entity is not comprehensible, and the term "scrambled" shall mean a data entity whose components are sequenced out of order such that the data entity is not comprehensible.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept, as described in greater detail herein in connection with various particular exemplary embodiments, provides methods and systems for ensuring the privacy of digital data during transmission of the data between a client system and a computing cloud and during any processing of the data by the cloud. In particular, the methods and systems of the disclosed concept protect the privacy of any type of data that manifests as an ordered data sequence. Non-limiting examples of ordered data sequences include digital image data, digital videos, digitally recorded medical clinician voice memos, and typed patient notes, as digital images are ordered arrays of pixel color values, digital videos are streams of consecutive images, digital voice memos are discrete information bits sequenced in a particular order, and typed patient notes are strings of text compiled in a particular order.

For economy of disclosure, the disclosed concept is described primarily in terms of protecting the privacy of image data and pseudo-randomizing the location of pixels within a digital image, however, it will be appreciated that the methods and systems applied to pixels within a digital image can be applied to other data units within non-image ordered data sequences without departing from the scope of the disclosed concept. For example and without limitation, component bits of a digital voice memo can be analogized to image pixels while the complete voice memo can be analogized to a complete image, and strings or string fragments of a typed patient note can be analogized to image pixels while the complete typed patient note can be analogized to a complete image.

The systems and methods of the disclosed concept ensure privacy of digital data by scrambling the data prior to transmitting the data to a cloud, specifically by changing the order of data units contained in an ordered data sequence. In addition, the methods and systems of the disclosed concept do not permit descrambled data to be stored in cloud storage and any processing performed by the cloud is performed on the scrambled data. By preventing descrambled data from being transmitted to the cloud and from being stored in cloud storage, in the event that a hacker breaches encryption protocols intended to protect the transmission and storage of data sent to a cloud, the hacker would only be able to obtain scrambled data. It will be appreciated that the term "unscrambled" can denote data as originally captured prior to scrambling, while the term "descrambled" can denote data that has been scrambled and then re-ordered to resemble the original unscrambled form. For brevity of disclosure, only one of the terms "unscrambled" or "descrambled" is used at a time herein to describe data that is not scrambled, and the use of "unscrambled" instead of "descrambled" and vice versa is not intended to be limiting.

Figure 2:
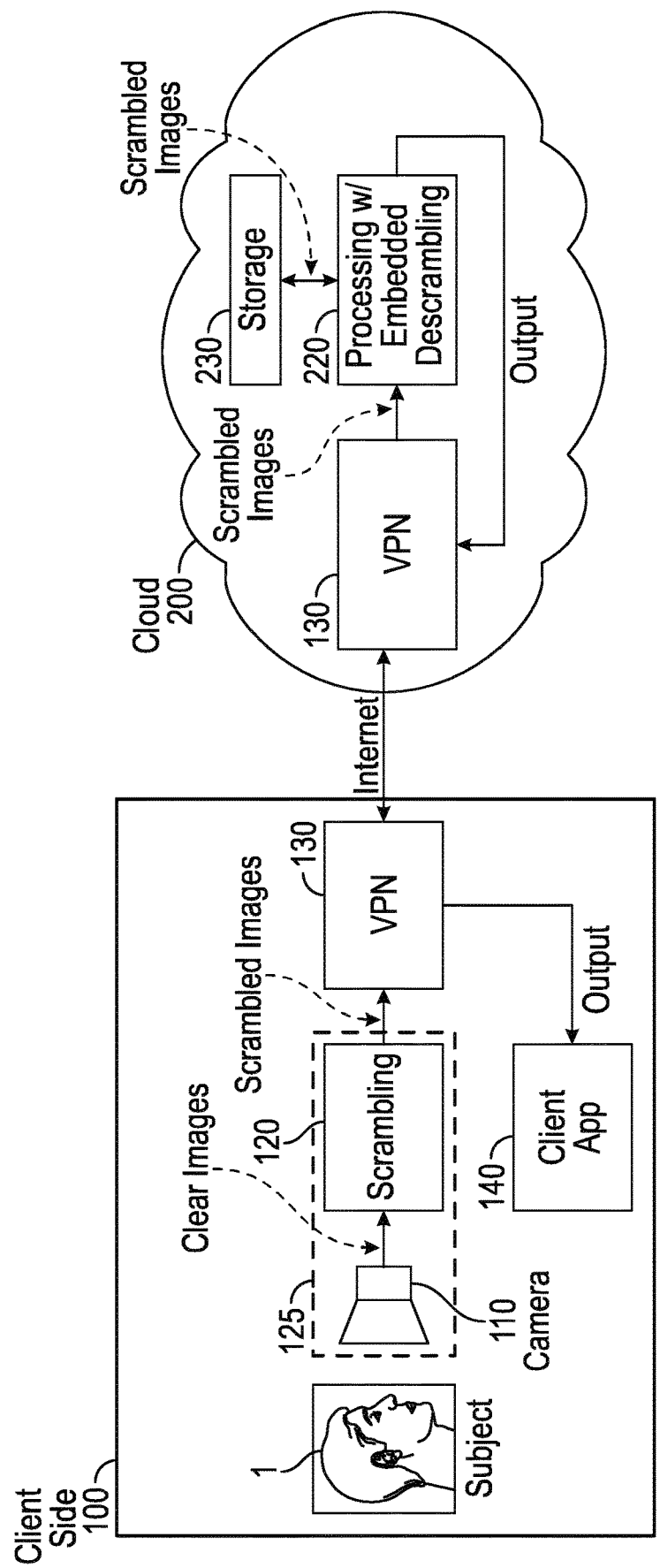
FIG. 2 is a schematic representation of a client computing system and a cloud computing system configured to communicate with one another and transmit digital data between one another according to the method depicted in FIG. 1, in accordance with an exemplary embodiment of the disclosed concept.

FIG. 1 is a flow chart containing the steps of a method 10 for protecting digital data transmitted from a client computing system to a cloud computing system in accordance with an exemplary embodiment of the disclosed concept, and FIG. 2 is a schematic representation of a client system 100 and a cloud system 200 configured to communicate with one another and transmit digital data between one another according to method 10 depicted in FIG. 1, in accordance with an exemplary embodiment of the disclosed concept. Client system 100 and cloud system 200 can comprise any combination of controllers or other computing hardware and software without departing from the scope of the disclosed concept, and the disclosed concept does not depend upon specific combinations of these elements being used. Client system 100 is configured to capture and scramble digital data and transmit the scrambled data to cloud system 200, while cloud system 200 is configured to process and store the scrambled data and subsequently transmit the processed data back to client system 100. Because the disclosed concept is described herein primarily in terms of protecting digital image data, client system 100 is depicted as comprising a camera 110. However, for a client that wants to protect other types of data transmitted to and stored in a cloud, it will be appreciated that a recording device appropriate for capturing non-image data would replace camera 110 in client system 100. For example and without limitation, where protection of clinician voice memos is desired, camera 110 would be replaced by voice recognition software and/or hardware. Furthermore, client system 100 can comprise multiple devices for capturing client data, for example and without limitation, both a camera and voice recognition software, without departing from the scope of the disclosed concept. As used herein, the terms "captured" and "captured client data" refer to data captured by camera 110 whose privacy the methods and systems of the disclosed concept are intended to protect.

Referring to FIGS. 1 and 2, at step 11 of method 10, client data is captured, i.e. camera 110 captures an image of a subject 1. At step 12, a data scrambler 120 scrambles the image captured by camera 110. Data scrambler 120 comprises software and/or hardware that scrambles the order of the pixels contained in the captured image as described in more detail herein. Scrambling data can be achieved using a variety of means, for example and without limitation by using either or both executable files and/or data files, and can be performed by any combination of software or hardware without departing from the scope of the disclosed concept. The scrambling performed by data scrambler 120 follows the basic premise that the original location (x, y) of each pixel in a 2D image captured by camera 110 is mapped to a new location (p, q) to create a scrambled image, with each mapping being unique such that no two locations $(x_a, y_b)$ and $(x_m, y_n)$ map to the same new location $(p_j, q_k)$, in order to prevent data loss. Examples of the specific implementation of data scrambling that data scrambler 120 can use are described in more detail with respect to Program D herein. Data scrambler 120 can either be a discrete component separate from camera 110 (or whatever data capturing device is used instead of camera 110) or integrated into camera 110 to form a data capturing/scrambling module 125 without departing from the scope of the disclosed concept. In such an embodiment where data scrambler 120 is integrated into camera 110, an unscrambled image would not exist or be stored in client system 100 after being captured by camera 110 and before being transmitted to cloud system 200.

At step 13 of method 10, the scrambled captured image is transmitted to cloud system 200, specifically to a processing module 220 of cloud system 200. Processing module 220 can comprise any combination of software and/or hardware that is capable of analyzing digital data. In FIG. 1, client system 100 and cloud computing system 200 are depicted as being connected via a virtual private network (VPN) 130 wherein the scrambled data output of data scrambler 120 is transmitted from client system 100 to processing module 220 through the VPN, in order to further protect the transmission of the client image data. VPN 130 may be omitted without departing from the scope of the disclosed concept, however, it will be appreciated that using a VPN or other data encryption system is considered a prudent measure for preventing unauthorized parties from intercepting private data being transmitted between two endpoints over the internet.

At step 14 of method 10, processing module 220 processes the scrambled client image. The processing performed by processing module 220 is context-specific. In the context of the captured client data comprising medical image data such as an MRI images, one non-limiting example of processing that can be performed by processing module 220 is identifying areas in the images that exhibit different pigmentation and/or clustering than surrounding tissue, which a clinician can further analyze for the presence of tumors or other concerns. In the methods and systems of the disclosed concept, any descrambling of scrambled images (or other captured client data) in cloud system 200 that may be necessary for processing the images is embedded in and/or integrated with any processing of the images that is performed by cloud system 200, rather than being performed separately from processing of the images, in order to prevent scrambled images being stored in cloud system 200.

If the processing performed by cloud system 200 requires storage of the client image data in cloud system 200, then scrambled images (and only scrambled images) are stored in cloud storage 230 at steps 15-16 of method 10. The requirement that stored data must be scrambled applies to storage of both complete images as well as parts thereof, and applies to storage on hard drives and in memory (e.g., RAM). Storage of the image data may be necessary, for example and without limitation, when cloud system 200 is used for temporal processing. Method 10 then returns to step 14 for further processing of the stored image data. If no storage or no further storage of the scrambled image data is necessary after the data is processed at step 14, then the processed data is transmitted at step 17 to a processed data receiver 140 comprising software and/or hardware in the client system 100 designated for receiving the processed client data.

In many contexts for which a client system such as client system 100 would use a cloud computing system such as cloud system 200 to process image data at step 14 of method 10, the output of processing would not necessarily be an image. For example and without limitation, in the previous example of using cloud system 200 to analyze Mill images for the presence of unusual pigmentation or clustering in body tissue, the desired output of processing by processing module 220 would be a listing of the locations of the pixels where the pigmentation or clustering is present. Program A, shown and described in more detail below, is a simple example of a program written in pseudocode that processing module 220 can use to determine the location of the brightest pixel in a 2D image, and demonstrates how the cloud processing function of determining the location of the brightest pixel can be performed using a scrambled image, without storing an unscrambled image in cloud system 200:

---
Program A

```
func Process(int img[N, M], ref int max, ref int xm, ref int ym)
    max = -1
    int pm, qm
    for int p = 0; p < M; p++
        for int q = 0; q < N; q++
            if img[p, q] > max
                max = img[p, q]
                pm = p
                qm = q
    map(pm, qm, ref xm, ref ym)
```
---

Referring to Program A, a 2D integer array "img" represents a scrambled 2D image produced by data scrambler 120 from a 2D image captured by camera 110. Array "img" has N rows and M columns, and each entry [p,q] of array "img" corresponds to a pixel of the scrambled image. It will be appreciated that the unscrambled image captured by camera 110 also has N rows and M columns of pixels. In one non-limiting example, each entry in the array "img" holds an integer value in the range of 0 to 255, as is done for byte image representations of grayscale 2D images. Function "Process" iterates through each scrambled image array entry [p,q] and compares the value of each entry [p,q] to the value of integer variable "max", with integer variable "max" holding the maximum value found thus far among the pixels already iterated. If the entry [p,q] currently being evaluated holds a value greater than the value currently stored in "max", the value of "max" is updated to hold the value held by the currently evaluated entry [p,q], and variables pm and qm are updated with the p and q values of the current entry [p,q], respectively. After function "Process" has iterated through all of the pixels in the scrambled image, the mapping function "map" maps the values of pm and qm (which represent the coordinates of the pixel in the scrambled image that holds the maximum pixel value) to the coordinating x coordinate xm and y coordinate ym in the unscrambled image. Processing module 220 would return, by reference, the coordinates xm and ym (which identify the location of the brightest pixel in the unscrambled image) to processed data receiver 140 without having stored a descrambled image.

More complex processing functions may require a program that maps the coordinates of the scrambled image to the corresponding coordinates in the unscrambled image more often than Program A does, and Program B, shown below, is an example of such a program:

---
Program B

```
func Process(int img[N, M], ref int max, ref int xm, ref int ym)
    max = -1
    for int p = 0; p < M; p++
        for int q = 0; q < N; q++
            if img[p, q] > max
                max = img[p, q]
                map(p, q, ref xm, ref ym)
```
---

The functions and variables used in Program B have the same conceptual meanings as in Program A, and Program B also finds the brightest pixel in a 2D image as Program A does. However, Program B maps the pm and qm coordinates of "max" from the scrambled image to the xm and ym coordinates of the unscrambled image every time "max" is updated, rather than only once after all of the pixels in the scrambled image have been iterated.

In addition, there may be contexts in which iterating over the x, y coordinates of an unscrambled image is preferable to iterating over the p, q coordinates of the scrambled image. Iterating over the x, y coordinates of an unscrambled image can also be performed without storing an unscrambled image in cloud system 200. Program C, shown below, is a simple example program that processing module 220 can use to determine the location of the brightest pixel in a 2D image by iterating over the x, y coordinates of an unscrambled image instead of the p, q coordinates of the scrambled image:

---
Program C

```
func Process(int img[N, M], ref int max, ref int xm, ref int ym)
    max = -1
    int xm, ym
    int p, q
    for int x = 0; x < M; x++
        for int y = 0; y < N; y++
            map2(x, y, ref p, ref q)
            if img[p, q] > max
                max = img[p, q]
                xm = x
                ym = y
```
---

Mapping function "map2" used in Program C implements the inverse function of mapping function "map" used in Programs A and B, i.e., mapping function "map2" maps x, y coordinates from the unscrambled image to p, q coordinates of the scrambled image. The variables used in Program C have the same conceptual meaning as in Programs A and B. Function "Process" in Program C iterates through each unscrambled image array entry [x,y], mapping the currently iterated [x,y] entry to the corresponding scrambled image array entry [p,q] with mapping function "map2", then comparing the value held by each entry [p,q] to the value currently stored in variable "max", which again holds the maximum value found among the pixels already iterated. If the entry [p,q] currently being evaluated holds a value greater than the value currently stored in "max", the value of "max" is updated to hold the value held by the currently evaluated entry [p,q], and variables xm and ym are updated with the x and y values of the current entry [x,y]. After "Process" has iterated through all of the pixels in the unscrambled image, x coordinate xm and y coordinate ym in the unscrambled image hold the coordinates of the pixel in the unscrambled image with the maximum pixel value. Processing module 220 would return the coordinates xm and ym to processed data receiver 140 to identify the location of the brightest pixel in the unscrambled image without having stored a descrambled image, just as Programs A and B do.

While Programs A, B, and C demonstrate processing where the output is not an image, it will be appreciated that, when the desired output of processing by processing module 220 is an image, processing module 220 would transmit a scrambled, processed image to processed data receiver 140 and processed data receiver 140 would map the p, q coordinates of the scrambled image to x, y coordinates to produce a descrambled, processed image. Furthermore, where the desired output of processing by processing module 220 is recognition of a subject in an image, processing module 220 can send an anonymized identifier to client system 100 so that client system 100 can de-anonymize the identifier using a mapping that is known only to the client. In sum, regardless of the desired output of processing by processing module 220, unscrambled and descrambled images are never stored in cloud system 200 in the systems and methods of the disclosed concept.

As previously stated with respect to step 12 of method 10, data scrambler 120 scrambles captured client data by changing the order of the individual pixels comprising the image captured by camera 110 such that the original location (x, y) of each pixel is mapped to a new location (p, q), each mapping being unique such that no two locations $(x_a, y_b)$ and $(x_m, y_n)$ map to the same new location $(p_j, q_k)$, in order to prevent data loss. Data scrambler 120 can implement any one of a number of techniques to scramble the image captured by camera 110 without departing from the scope of the disclosed concept. In a first non-limiting example of a technique for scrambling data, a stored lookup table can be used to map the original location (x, y) of each pixel to a new pseudo-random location (p, q) such that p≠x and q≠y. In a second non-limiting example of a technique for scrambling data, for a given 2D image with a horizontal size of M pixels and a vertical size of N pixels, a mathematical function $f_g$ can be used to assign a new location $(p_m, q_n)$ to each pixel whose original location is $(x_m, y_n)$, such that $(p_m, q_n)=f_g(x_m, y_n)$ where $p_m \neq x_m$ and $q_n \neq y_n$ for all m∈0 . . . M−1, n∈0 . . . N−1. It will be appreciated that the mapping of the original pixel locations to the scrambled locations does not need to be stored when a mathematical function is used to scramble the image captured by camera 110, since mappings and inverse mappings can be generated in real time by solving the mapping functions or inverse mapping functions.

Furthermore, in an exemplary embodiment, client system 100 can be configured so that the specific iteration of scrambling that data scrambler 120 uses is changed periodically to further increase security of the captured client data. In a first non-limiting example, if data scrambler 120 uses a stored lookup table to scramble data, the particular stored lookup table used can be changed every P images, with P≥1. In a second non-limiting example, when data scrambler 120 uses a mathematical function to scramble data, the particular function used can be changed every P images, with P≥1. It will be appreciated that, if client system 100 is configured to periodically change the specific iteration of scrambling used, client system 100 and cloud system 200 must be synchronized to ensure that the mapping used for descrambling during processing on the cloud side is the same mapping used for scrambling on the client side. In a first non-limiting example of a technique for ensuring that cloud system 200 is synchronized with client system 100 and knows which specific iteration of scrambling was used for a given image, client system 100 would assign a sequence number to each image to be transmitted along with the scrambled image to cloud system 200, and cloud system 200 would be configured to determine what scrambling technique data scrambler 120 used based on the sequence number. As described in more detail below with respect to Program D, in a second non-limiting example of a technique for ensuring that cloud system 200 is synchronized with client system 100 and knows which specific iteration of scrambling was used for a given image, client system 100 would assign a code to each image to be transmitted along with the scrambled image to the cloud system 200, and cloud system 200 would be configured to determine what scrambling technique data scrambler 120 used based on the code.

Program D, shown below, is a simple example of a program that enables processing module 220 to implement dynamic descrambling during processing based on a code transmitted by client system 100:

Program D

```
func Process(int img[N,M], string code,ref int max,ref int xm,ref int ym)
    max = −1
    int xm, ym
    int p, q
    for int x = 0; x < M; x++
        for int y = 0; y < N; y++
            map3(code, x, y, ref p, ref q)
            if img[p, q] > max
                max = img[p, q]
                xm = x
                ym = y
```

Program D functions similarly to how Program C functions, but in addition to performing the functions of Program C, Program D reads a code assigned by client system 100 denoting the specific implementation of data scrambling used by data scrambler 120 and maps p, q coordinates from a scrambled image to the corresponding x, y coordinates of the unscrambled image accordingly. More specifically, the function "Process" in Program D requires the string argument "code" (supplied by client system 100) in addition to the arguments required by the function "Process" used in Program C, and mapping function "map3" used in Program D uses the argument "code" in addition to the arguments required by the mapping function "map2" used in Program C. Mapping function "map3" functions similarly to mapping function "map2" by mapping x, y coordinates from an unscrambled image to p, q coordinates of the corresponding scrambled image, but "map3" additionally uses the string argument "code" to determine which iteration of scrambling should be used to do so. As with Program C, processing module 220 can use Program D to determine the location of the brightest pixel in a 2D image by iterating over the x, y coordinates of an unscrambled image instead of the p, q coordinates of the scrambled image, but unlike Program C, Program D can be used by a cloud system 200 to process images transmitted by a client system 100 that periodically changes the specific iteration of scrambling used by data scrambler 120 and assigns a code to each image denoting which iteration of scrambling was used.

It will be appreciated that Programs A, B, C and D are presented as illustrative examples of how processing module 220 can perform processing without the need to store unscrambled images, and that the concepts embodied by these programs can be combined or extrapolated to other and/or more complex groupings of data without departing from the scope of the disclosed concept. For example and without limitation, if client system 100 were to transmit RGB color images to cloud system 200 for processing, scrambling for each of the three planes R, G, and B could be performed independently of the other planes such that the same mapping techniques could be used for all of the planes or a different mapping could be used for each plane.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of transmitting digital data between a client computing system and a cloud computing system and processing the digital data with the cloud computing system, the method comprising:
    directly capturing, with a recording device in the client computing system, unscrambled data, wherein the unscrambled data includes component data units;
    scrambling, with the client computing system, the unscrambled data by changing the order of unmodified component data units to produce scrambled data, wherein the scrambled data is not comprehensible;
    transmitting, with the client computing system, the scrambled data to the cloud computing system;
    processing, with the cloud computing system, the scrambled data; and
    transmitting, with the cloud computing system, an output of the processing to the client computing system,
    wherein descrambled data is not stored in the cloud computing system, and
    wherein the output of the processing does not include a descrambled form of the scrambled data.

2. The method of claim 1, wherein processing comprises descrambling the scrambled data.

3. The method according to claim 1, wherein processing comprises producing output mapped to the unscrambled data.

4. The method according to claim 1,
    wherein the unscrambled data comprises data sequences such that each data sequence comprises a plurality of component data units.

5. The method according to claim 4,
    wherein, for a given data sequence, scrambling comprises using a mathematical function to map each of the plurality of component data units in the given data sequence to a new location, the new location being unique relative to new locations to which all other component data units in the given data sequence are mapped.

6. The method according to claim 1, further comprising:
    periodically changing, with the client computing system, the technique of scrambling used to scramble the unscrambled data.

7. The method according to claim 1, further comprising:
    transmitting, with the client computing system, a scrambling identifier with the scrambled data from the client system to the cloud.

8. The method according to claim 1, further comprising:
    descrambling, with the client computing system, any scrambled output of the processing.

9. The method of claim 1, wherein the recording device in the client computing system includes a camera and/or voice recognition software and/or hardware.

10. The method according to claim 4,
    wherein, for a given data sequence, scrambling comprises using a stored lookup table to map each of the plurality of component data units in the given data sequence to a pseudorandom location, the pseudorandom location being unique relative to pseudorandom locations to which all other component data units in the given data sequence are mapped.

11. The method according to claim 7,
    wherein the cloud computing system is configured to identify what technique of scrambling was used by the client computing system based on the scrambling identifier.

12. A data protection system for protecting digital ordered data sequences, the data protection system comprising:
    a client computing system configured to directly capture and transmit client data outside of the client computing system, the client computing system comprising:
        a recording device configured to capture client data, the client data comprising data sequences such that each data sequence comprises a plurality of component data units;
        a data scrambler configured to receive client data captured by the recording device and to scramble the client data by changing the order of unmodified component data units to produce scrambled data, wherein the scrambled data is not comprehensible; and
        a processed data receiver; and
    a cloud computing system, the cloud computing system comprising:
        a data processing module configured to process client data transmitted from the client computing system and to output processed client data; and
        a cloud storage unit configured to store client data processed and output by the data processing module,
    wherein the client computing system is configured to transmit only scrambled client data to the cloud computing system, and
    wherein the data processing module is configured to not output descrambled client data.

13. The data protection system of claim 12, wherein the data processing module is configured to descramble scrambled client data during processing.

14. The data protection system according to claim 12,
    wherein the data processing module is configured to produce output mapped to unscrambled client data.

15. The data protection system according to claim 12, wherein, for a given data sequence, scrambling comprises using a stored lookup table to map each of the plurality of component data units in the given data sequence to a pseudorandom location, the pseudorandom location being unique relative to pseudorandom locations to which all other component data units in the given data sequence are mapped.

16. The data protection system according to claim 12, wherein, for a given data sequence, scrambling comprises using a mathematical function to map each of the plurality of component data units in the given data sequence to a new location, the new location being unique relative to new locations to which all other component data units in the given data sequence are mapped.

17. The data protection system according to claim 12, wherein the client computing system is configured to periodically change a data scrambling technique used by the data scrambler.

18. The data protection system according to claim 12, wherein the client computing system is configured to transmit a scrambling identifier with scrambled client data when transmitting scrambled client data to the cloud computing system.

19. The data protection system of claim 12, wherein the client computing system is configured to descramble any scrambled output of the processing.

20. The data protection system according to claim 18, wherein the cloud computing system is configured to identify what technique of scrambling was used by the client computing system based on the scrambling identifier.

21. The data protection system according to claim 12, wherein the recording device in the client computing system includes a camera and/or voice recognition software and/or hardware.

* * * * *